United States Patent [19]

Svensson

[11] 4,305,430

[45] Dec. 15, 1981

[54] APPARATUS FOR DISTRIBUTING FLUIDS

[75] Inventor: Conny Svensson, Oskarshamn, Sweden

[73] Assignee: Elajo Invest Aktiebolag, Oskarshamn, Sweden

[21] Appl. No.: 85,522

[22] Filed: Oct. 17, 1979

[30] Foreign Application Priority Data

Oct. 19, 1978 [SE] Sweden .............................. 7810927

[51] Int. Cl.³ ............................................ F16L 9/18
[52] U.S. Cl. .................................... 138/115; 138/111; 174/48
[58] Field of Search ............... 138/111, 115, 116, 117; 174/48

[56] References Cited

U.S. PATENT DOCUMENTS

| | | | |
|---|---|---|---|
| 3,580,984 | 5/1971 | Gladh | 174/48 |
| 3,747,632 | 7/1973 | Kok et al. | 138/111 |
| 3,907,002 | 9/1975 | Gulich | 138/115 |
| 4,216,823 | 8/1980 | Keldman | 174/48 |

FOREIGN PATENT DOCUMENTS 18690 of 1893 United Kingdom ................ 138/111

Primary Examiner—Steven L. Stephan
Attorney, Agent, or Firm—James E. Nilles

[57] ABSTRACT

A module for conducting each of a plurality of fluids from a source thereof to a desired delivery location along a wall comprises a horizontally elongated body having therein a plurality of lengthwise extending bores, one for each fluid, that are spaced apart vertically. On an upright front surface of the body there are a plurality of linear indicia, preferably V-grooves, one for each bore. Each indicium is contained in a horizontal plane that also contains the axis of its bore, so that an outlet from each bore can be formed anywhere along its length by drilling rearwardly into the bore from its indicium. The body has a uniform cross-section along its length to be suitable for extrusion, and it includes an attachment portion and portions that provide a dust seal between it and a wall to which it is attached.

8 Claims, 10 Drawing Figures a b c d

APPARATUS FOR DISTRIBUTING FLUIDS

FIELD OF THE INVENTION

This invention relates to apparatus for distributing liquids and gases from respective sources thereof that are remote from a point of use to desired locations at which the fluids are to be available; and the invention is more particularly concerned with structure whereby each of a plurality of different fluids can be conducted to a desired location along an interior surface of a room.

BACKGROUND OF THE PRIOR ART

In many cases there is a need for several different gases and/or liquids to be available in a single room. A typical such situation is a room in a hospital in which supplies of air, oxygen and nitrous oxide must be available and in which there must also be a vacuum connection for evacuation of gases. Similar requirements are presented by various types of laboratories and workshops.

In such cases it has heretofore been conventional to distribute each different fluid in a duct system which was specific to that fluid and which extended from a source of the fluid to an outlet at the location where the fluid was needed.

The heretofore conventional arrangements of ducts for distribution of fluids from central sources have had a number of disadvantages. Installing ducts within walls and similar structure is very expensive and can give rise to difficult and costly problems when leaks develop or when changes must be made in the locations of outlets. A system of exposed individual ducts for delivery of several different fluids is unattractive in appearance, tends to collect dust and dirt, is hard to keep clean, and—although less costly than concealed duct work—is still very expensive. In any installation involving several different ducts in proximity to one another there is an obvious risk of confusion between ducts, with possibly serious consequences.

To avoid these disadvantages, individual storage tanks containing needed fluids have sometimes been located in the rooms where the fluids were to be used, thus eliminating long conduits extending from central sources to the various points of use. However, such individual storage tanks or accumulators are in themselves bulky and expensive. Furthermore, if a particular fluid is needed in several different rooms or at several substantially spaced apart locations, it is obviously inefficient to provide an accumulator or storage tank for each such location.

The general object of the present invention is to overcome all of these disadvantages of prior arrangements for delivery of various fluids to desired locations and to provide a simple and inexpensive structure that can be quickly and easily installed, is very satisfactory in appearance, is very easily kept clean, and enables each of several different fluids to be conducted from a remote source and made available at any desired location along a wall or similar surface of a room.

Another and more specific object of the invention is to provide structure suitable for exposed installation that comprises several ducts arranged in such a manner that the fluid to be carried by each is readily identifiable, each duct being readily connectable to a source of the fluid it is to carry and being adapted to be tapped at substantially any point along its length where fluid carried by it is to be utilized.

It is also a specific object of this invention to provide structure that comprises a plurality of ducts defined by a unitary body that can be readily formed of metal or plastic by a molding process or by a continuous casting or extrusion process, and wherein the several ducts are readily identifiable.

It is also a specific object of this invention to provide a modular duct unit of the character described that is readily connectable with other similar units and with sources of fluids to be carried by the ducts, and which can also provide for connection thereto of certain useful and appropriate accessory devices.

SUMMARY OF THE INVENTION

In general, the objects of the invention are achieved in structure that comprises a body which is elongated in a horizontal direction and which has a substantially upright front surface and a top surface that extends rearwardly from said front surface. Said body also has a plurality of bores therein, each providing a duct for one of a plurality of different fluids to be delivered from a source to a desired location along a wall or similar surface, which bores extend lengthwise of the body and are spaced from one another in a vertical direction. On its front surface the body has a substantially linear indicium for each of the bores, and said indicium for each bore is contained in a horizontal plane which also contains the axis of its bore so that a hole drilled rearwardly into the body at any point along an indicium will intercept the bore for that indicium and provide an outlet therefrom.

In a preferred embodiment of the invention, said body has opposite substantially flat end surfaces, to each of which each of said bores opens, so that one end of every bore can be closed by a single sheet-like cover overlying one of said end surfaces, while the other end of each bore is connected with a source of fluid.

Also, in a preferred embodiment of the invention, the body has attachment means at its rear by which it can be secured to a room wall in overlying relation to the surface thereof; and there are sealing means at the rear of the body, at least adjacent to the top surface of the body, engageable against the surface of a wall to which the body is secured.

BRIEF DESCRIPTION OF DRAWINGS

In the accompanying drawings, which illustrate what are now regarded as preferred embodiments of the invention.

DETAILED DESCRIPTION OF PREFERRED EMBODIMENTS OF THE INVENTION

Figure 1:
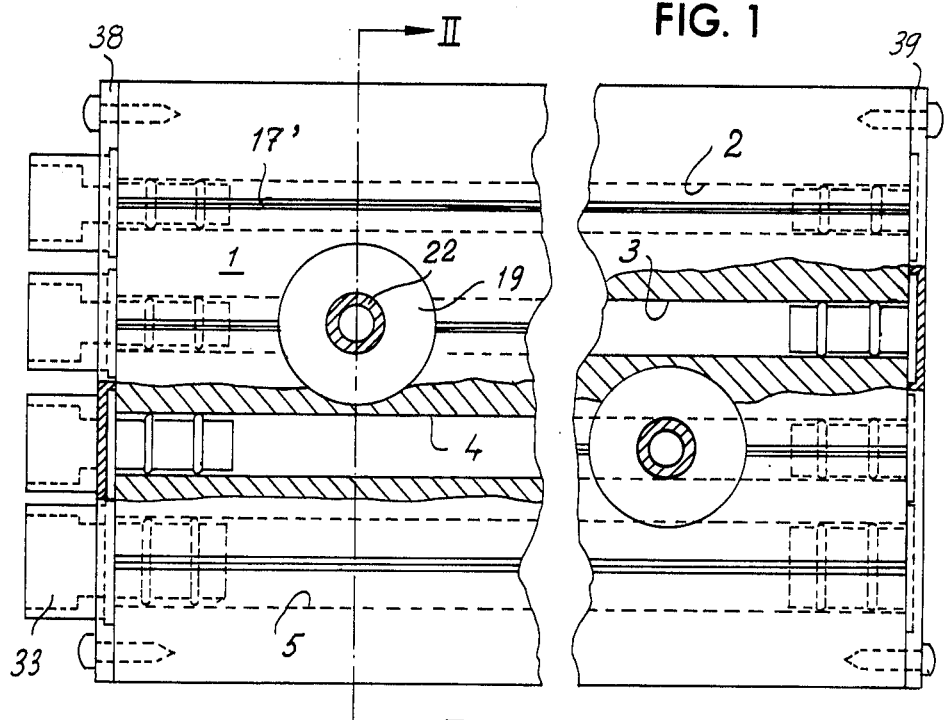
FIG. 1 is a view in front elevation, with portions shown broken away, of a small portion of structure embodying the present invention.

Referring now to the accompanying drawings, duct structure embodying the principles of this invention comprises an elongated modular body 1 that can suitably be formed by extrusion of light metal inasmuch as its cross-section can be uniform all along its length. The body 1 is elongated in a direction that is herein designated as horizontal because the body will in most installations be oriented lengthwise horizontally, but such terms of orientation as "horizontal" and "vertical" are used herein to simplify description and not in the sense that the body is required to be installed in any particular orientation.

Within the body 1 there are a number of bores 2-5 which extend lengthwise of the body and which thus extend horizontally as that term is used herein. The bores 2-5 are spaced from one another in a vertical direction. It is preferred that the bores 2-5 be of successively increased diameter from top to bottom. Each bore serves as a duct that is intended to carry a different fluid; thus, for example bore 2 may carry pure oxygen, bore 3 nitrous oxide, bore 4 pressure air and bore 5 suction.

Figure 2:
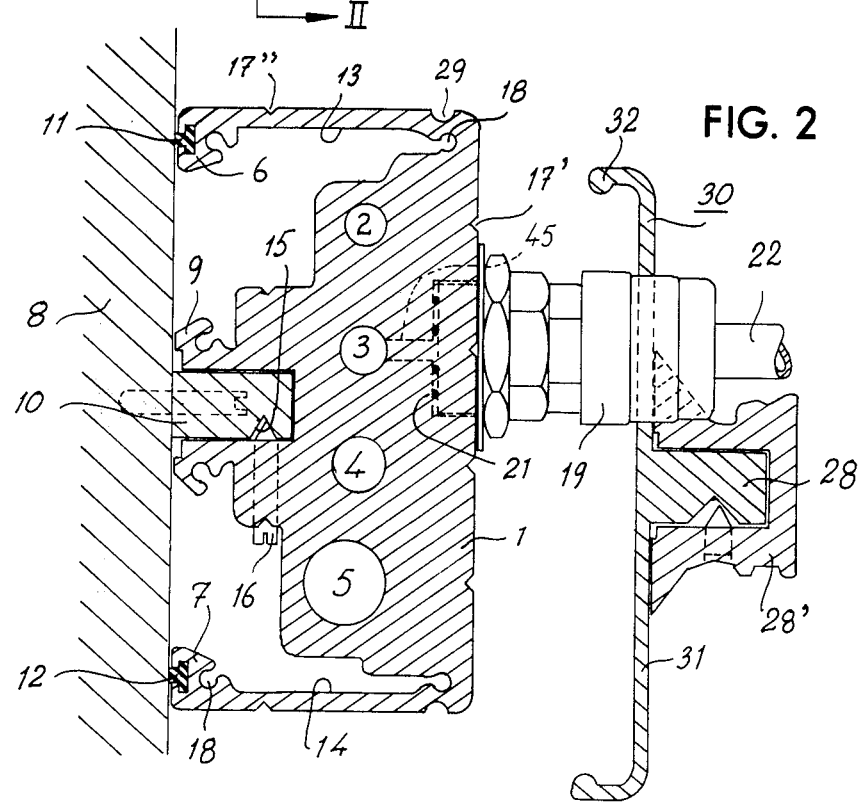
FIG. 2 is a view in cross-section, taken on the plane of the line 2—2 in FIG. 1.
Figure 3:
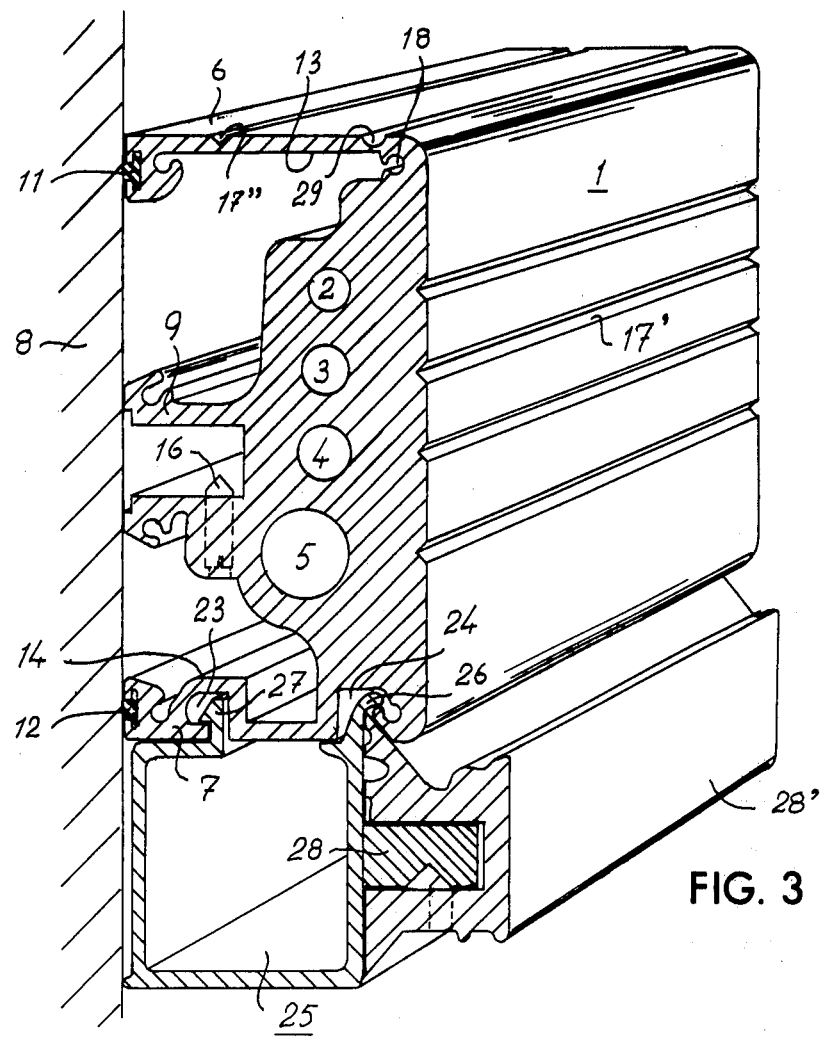
FIG. 3 is a perspective view of a modified form of structure according to the invention, taken at a vertical cut therethrough.

The body 1 is formed with a substantially flat, upright front surface and a top surface which is likewise substantially flat, so that it can be easily kept clean. As best seen in FIGS. 2 and 3, the body 1 can have a more or less block-like medial core portion in which the bores 2-5 are formed and can have integral horizontal flanges 13 and 14 which project rearwardly from that core portion and respectively provide a top surface and a preferably flat bottom surface. The two flanges 13 and 14 of course extend along substantially the full length of the unit. Projecting rearwardly from the core portion, between the flanges 13 and 14, is an attachment portion 9 that provides for securement of the body to a wall structure 8 in overlying relation to the surface thereof. It will be apparent that the body 1, when installed, presents somewhat the appearance of a molding.

The respective upper and lower flanges 13 and 14 terminate at thickened rear edge portions 6 and 7 having rearwardly opening grooves wherein there are resilient sealing strips 11 and 12 that engage against the surface of a wall 8 on which the structure is installed to prevent dust and dirt from entering the space between the body and the wall. It will be evident that the respective flanges 13 and 14, in cooperation with the main portion of the body, the attachment portion 9 and a wall 8 on which the body is installed, provide upper and lower cavities that extend along the full length of the body and can accommodate electrical wiring or additional individual ducts if they are found necessary.

The body 1 is secured to a wall 8 by means of mounting blocks 10 that are fastened to the wall and are closely received in a rearwardly opening slot in the attachment portion 9 of the body. The blocks 10 can be of a standard type conventionally used in hospitals for the connection of other objects intended to be supported from a wall, such as a so-called intensive nursing bar. Each of the blocks 10 has a V-groove 15 at its underside in which are received the tips of screws 16 that extend upwardly through the attachment portion 9 of the body.

The front surface of the body 1 is provided with a substantially linear indicium 17' for each of the duct bores 2-5 in the body, preferably in the form of a V-groove. Each of the indicia 17' is forwardly in line with the axis of one of the bores 2-5, which is to say that a horizontal plane which contains the axis of a bore will also contain the indicium 17' for that particular bore. The indicia 17' thus identify the locations of the several duct bores, so that it is readily possible to tap into any selected one of the bores 2-5, at any location along the length of the body, by simply drilling straight back from the V-groove 17' for that bore until the drill enters the bore to form an outlet from it. Similarly, there can be V-grooves 17" in the top surface of the upper flange 13 and the bottom surface of the lower flange 14, to designate lines along which holes can be drilled through which the fastening screws 16 can be installed. To facilitate drilling holes in which the screws 16 are received, the top and bottom surfaces of the attachment portion 9 of the body can also have V-grooves, as best seen in FIG. 2.

When the body 1 is installed, the duct that comprises each of the bores 2-5 is closed at one end and has its other end connected with an appropriate fluid source, as further explained hereinafter.

When a hole 45 (FIG. 2) is drilled into one of the duct bores 2-5 to provide an outlet therefrom, a suitable nipple 19 is inserted into the hole and is sealed to the body 1 as by means of O-rings 21 or other suitable sealing means. The nipple 19 can have a threaded connection with the body 1 or it can be secured to the body by means of a separate threaded connection device of known type. The nipple 19 provides for connection of a hose 22 or the like to the duct bore, in a known arrangement.

In the modified form of body 1 that is illustrated in FIG. 3, the body is formed at its bottom with rear and front downwardly opening grooves 23 and 24 that are of L-shaped cross-section, to provide for mounting at the underside of the body a channel-shaped member 25 that serves as a conduit which can accommodate additional fluid ducts that might be needed, or electrical wiring, communications system cables, antenna lead-ins or the like. The channel 25 can be open at its top. Its front upwardly projecting leg can have a cross-section near its upper edge that defines a connecting hook 26 which is engageable in the groove 24, whereas its rear leg has its upper edge portion formed in cross-section to provide a locking hook 27 that lockingly engages in the groove 23. At its front side the channel 25 may be formed to provide a forwardly projecting mounting block 28 that can support an intensive nursing bar 28' or a similar device. An intensive nursing bar is a known type of support used for various apparatus and instruments.

An alternative means for supporting an intensive nursing bar 28' on a body 1 of this invention is illustrated in FIG. 2, comprising one or more front clamps 30 that are clipped over the front of the body 1. Each such clamp 30 comprises an upright plate 31 from which a mounting block 28 projects forwardly and from the top and bottom edges of which short flanges 32 project rearwardly. The rear edges of the flanges 32 are thickened to snap into longitudinal grooves 29 in the top and bottom surfaces of the body 1, spaced behind its front surface at a distance such that the clamp 30 is held in place with its front plate 31 flatwise overlying the front surface of the body 1. An intensive nursing bar 28' is secured in a generally conventional manner to the forwardly projecting mounting block 28 on the front plate 31.

At each of its opposite ends the body 1 has a flat surface to which the duct bores 2-5 open. That surface may lie in a plane which is normal to the axes of the duct bores 2-5 (as will usually be the case) or it may be oblique to those axes to provide for an angled connection between the body 1 and an endwise adjacent body. When the structure has been installed, each of the flat end surfaces of the body 1 is overlain by a flat cover plate 38 or 39 which is held in place by screws. To receive the screws just mentioned, the cross-section of the body is so formed as to provide screw pockets 18 (FIGS. 2 and 3) at appropriate locations. A cover plate 38 is installed at an end of a body at which its duct bores 2-5 are communicated with fluid sources, and such a cover plate cooperates with connecting nipples 33 as explained hereinafter. A cover plate 39 is installed at an end of a body at which its bores 2-5 are blocked, where the cover plate 39 cooperates with bore plugs 34.

A connecting nipple 33 (see FIG. 6a) comprises a tubular shaft 35 having external circumferential grooves 36 for O-rings. A plug 34 (FIG. 6b) comprises a solid shaft 35 having similar O-ring grooves 36. In each case there is a collar 37 on the front portion of the shaft 35 that flatwise overlies the end surface of the body 1 and is overlain by the cover 38 or 39. A cover 38 at an inlet end of the body will of course have holes through which the inlet end portions of the nipples 33 project, as can be seen at the left side of FIG. 1. A cover 39 for the blocked end of a body 1 has recesses for the collars 37 of the plugs 34, as can be seen at the right side of FIG. 1. In each case the cover 38 or 39 cooperates with the collar 37 to confine the nipple 33 or plug 34 against axial displacement relative to the body 1.

Figure 6:
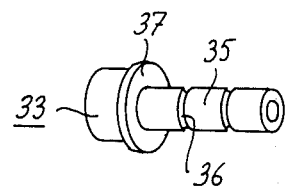
FIGS. 6a-6d are perspective views of elements for connecting and joining structural units of this invention.
Figure 6:
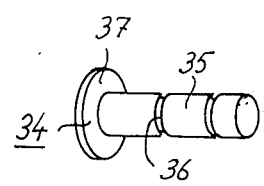
Figure 6:
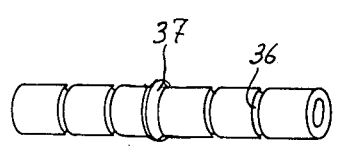
Figure 6:
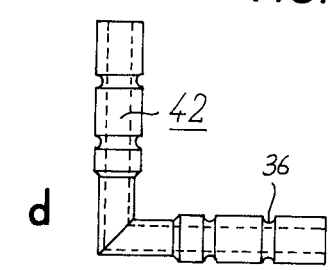

For connecting modular bodies 1 in end-to-end relation to one another, connecting nipples such as are shown in FIG. 6c are inserted into adjacent end portions of their communicating duct bores to prevent leakage at the joint. The endwise adjacent bodies 1 are secured to one another by reason of their connections to a mutual mounting block 10 in the wall on which they are mounted, or, if necessary, by connecting both of them to a length of similar mounting block that extends across their adjoining ends.

Although the body 1 is herein shown and described as mounted to an upright wall 8, it could equally well be mounted on a ceiling, in which case it would be oriented to have its rearwardly projecting flanges 13 and 14 extending upwardly from its front surface. It could likewise be mounted on a floor with the flanges 13, 14 projecting downwardly. It can of course be arranged to extend through several rooms, and if a single modular body 1 is not long enough for a particular installation, two or more such bodies can readily be connected end-to-end. Similarly, if a body 1 is too long, it can be readily cut down to a required length.

Figure 4:
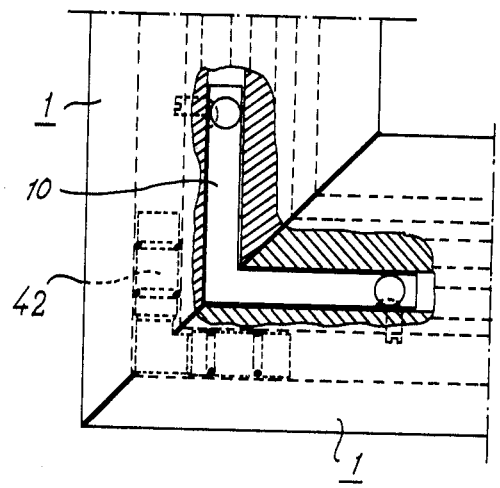
FIG. 4 is a view in elevation, with a portion shown broken away, illustrating a right-angle connection in a vertical plane between a pair of structural units of this invention.
Figure 5:
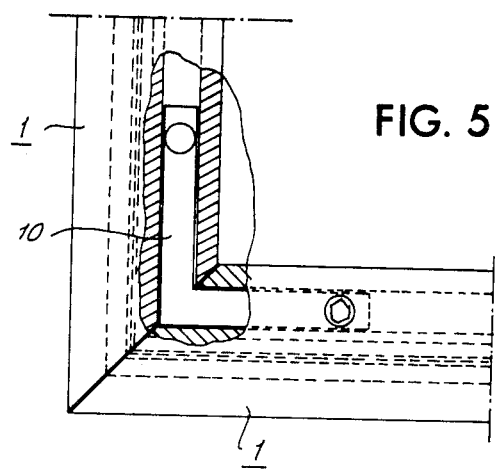
FIG. 5 is a plan view, with a portion shown broken away, illustrating a right-angle connection in a horizontal plane between a pair of structural units of this invention.
Figure 7:
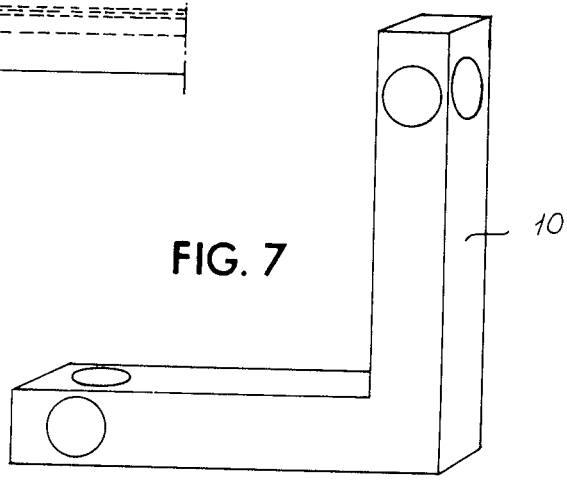
FIG. 7 is a perspective view of an angle block for mechanically interconnecting structural units.

For connection of bodies 1 at any desired angle to one another, either in a vertical plane as shown in FIG. 4 or in a horizontal plane as shown in FIG. 5, the adjoining ends of the bodies are mitered at the proper angle, and their duct bores are interconnected by means of elbow nipples 42 (see FIG. 6d). In order to make it possible to bring the mitered ends of the adjacent bodies as close together as possible, the central angled portion of such an elbow nipple 42 has a smaller diameter than the axially outer sealing portions thereof in which O-ring grooves 36 are formed. Mechanical securement of angularly connected bodies 1 to one another and to a supporting wall 8 or the like is provided for by means of angular locking blocks 10 of the type shown in FIGS. 4, 5 and 7, received in the rearwardly opening groove in the attachment portion 9 of the body. That groove preferably has a square cross-section, as have the angular locking blocks, to accommodate both horizontally and vertically angled joints.

After the bodies 1 comprising a duct system are installed by securing them to wall-mounted blocks 10, the outer end of the endmost downstream body is sealed with plugs 34 and a cover 39, and the inlet end of the system is connected to the fluid sources by means of the inlet nipples 33. The nipples 33 may comprise shut-off valves, or a shut-off valve can be connected between each inlet nipple 33 and its fluid source. At any place where a supply of fluid is desired, a hole 45 (FIG. 2) is drilled into the appropriate duct bore 2-5 and a nipple 19 is secured in that hole. The nipple 19 can comprise a shut-off valve, or a shut-off valve can be connected between the nipple and its hose 22, so that the duct bores 2-5 can be continuously under fluid pressure. It will be apparent that any number of outlets can be provided in the system and that an outlet hole 45, when no longer needed, can be readily closed off with a suitable sealing plug.

From the foregoing description taken with the accompanying drawings it will be apparent that this invention provides a convenient, attractive, inexpensive and easily installed duct system for conducting each of a plurality of fluids from a source thereof to a desired location along an interior surface of a room.

I claim:

1. Structure for conducting each of a plurality of different fluids from a source thereof to a selectable location along a wall or the like, said structure being characterized by:
   A. a body which is elongated in a horizontal direction,
      (1) said body having a plurality of bores therein that extend lengthwise of the body and are spaced from one another in a vertical direction, each providing a duct for one of said fluids,
      (2) said body having a substantially upright front surface in which there are grooves, one for each bore, each groove being contained in a horizontal plane which also contains the axis of its bore so that each groove serves as an indicium for the location of its bore and can steady the tip of a drill for drilling rearwardly into its bore at any point along the length of the groove; and
   B. said body having substantial thickness between its said front surface and each of said bores, so that when a hole is drilled rearwardly into a bore from said front surface, an outlet fitting inserted into said hole can have secure connection with the body.

2. The structure of claim 1, further characterized by:
   C. said body having opposite substantially flat end surfaces, to each of which each of said bores opens so that said body can be secured in closely adjacent end-to-end relationship with another like body and have its respective bores communicated with corresponding bores in said other body.

3. The structure of claim 1 wherein said body has a top surface which extends rearwardly from said front surface, further characterized by:
- C. attachment means at the rear of said body for securing the same to a wall in overlying relation thereto; and
- D. sealing means at the rear of said body, adjacent to said top surface of the body, engageable against a wall to which the body is secured to prevent entry of dust and the like between the body and said wall.

4. The structure of claim 3 wherein said attachment means is integral with a portion of the body in which said bores are formed and projects rearwardly therefrom, and wherein said attachment means has a rearwardly opening slot therein in which can be received a block or the like that projects from a wall on which the structure is mounted, to provide for securement of the structure to the wall.

5. The structure of claim 4 further characterized by:
- (1) said top surface of the body being defined by an upper flange which projects rearwardly from said portion of the body in which the bores are formed and which is spaced above said attachment means and cooperates with it and with said portion of the body to define an upper conduit;
- (2) the body also having a lower flange which projects rearwardly from said portion of the body and defines an undersurface of the body, said lower flange being spaced below said attachment means and cooperating with it and with said portion of the body to define a lower conduit.

6. The structure of claim 5 wherein said sealing means is carried by a rear edge portion of said upper flange, further characterized by:
sealing means near the bottom of the body carried by said rear edge portion of the lower flange.

7. The structure of claim 1 wherein each of said bores has a different diameter than any of the others, to adapt the several bores to the respective flow rates of fluids to be conducted by them and to minimize risk of confusion between bores and between fluids conducted by the bores.

8. The structure of claim 1, further characterized by:
said body having a uniform cross-section all along its length so that it can be formed by an extrusion process.

* * * * *